(12) United States Patent
Katterheinrich

(10) Patent No.: US 9,004,438 B2
(45) Date of Patent: Apr. 14, 2015

(54) DISPLAY STAND AND BRACKET

(71) Applicant: Target Brands, Inc., Minneapolis, MN (US)

(72) Inventor: Kent D. Katterheinrich, Shoreview, MN (US)

(73) Assignee: Target Brands, Inc., Minneapolis, MN (US)

( * ) Notice: Subject to any disclaimer, the term of this patent is extended or adjusted under 35 U.S.C. 154(b) by 155 days.

(21) Appl. No.: 13/705,827

(22) Filed: Dec. 5, 2012

(65) Prior Publication Data

US 2014/0151524 A1    Jun. 5, 2014

(51) Int. Cl.
| | |
|---|---|
| *A47G 1/00* | (2006.01) |
| *F16M 13/00* | (2006.01) |
| *F16M 11/10* | (2006.01) |
| *A47G 1/14* | (2006.01) |
| *A47B 23/04* | (2006.01) |
| *G06F 1/16* | (2006.01) |

(52) U.S. Cl.
CPC ......... *F16M 13/00* (2013.01); *Y10T 403/32606* (2015.01); *G06F 1/1616* (2013.01); *F16M 11/10* (2013.01); *A47G 1/143* (2013.01); *A47G 2001/146* (2013.01); *A47B 23/043* (2013.01)

(58) Field of Classification Search
CPC ....... F16M 11/00; F16M 11/10; F16M 13/00; F16C 11/04; G06F 1/166; G06F 1/1616; A47B 23/043; A47G 1/143
USPC .......... 248/444, 447, 454, 459, 460, 463, 248/188.2, 188.4, 188.8, 918, 919, 465.1, 248/472, 688; 361/679.59, 679–686, 361/679.27, 679.55; D14/375, 447
See application file for complete search history.

(56) References Cited

U.S. PATENT DOCUMENTS

| | | | | |
|---|---|---|---|---|
| 253,457 | A | * 2/1882 | Wiederer | ............. 248/471 |
| 452,766 | A | 5/1891 | Dawdy | |
| 649,293 | A | 5/1900 | French | |
| 685,458 | A | 10/1901 | McIntyre | |
| 838,516 | A | 12/1906 | Bodinger | |
| 1,258,120 | A | 3/1918 | Kaplan | |
| 1,330,004 | A | 2/1920 | Rand | |
| 1,609,673 | A | 12/1926 | Taylor | |
| 1,820,841 | A | * 8/1931 | Soref | ............. 248/463 |
| 1,840,659 | A | 1/1932 | Eburne et al. | |
| 1,959,746 | A | 5/1934 | Stout | |
| 2,640,747 | A | 6/1953 | Bodenhoff | |
| 2,806,669 | A | 9/1957 | Vernon | |

(Continued)

OTHER PUBLICATIONS

Office Action from Canadian Patent Application No. 2,808,562, mailed Jun. 26, 2013 (2 pages).

*Primary Examiner* — Tan Le
(74) *Attorney, Agent, or Firm* — JoAnn M. Seaton; Griffiths & Seaton PLLC

(57) ABSTRACT

A display stand includes a base, a leg and a bracket. The bracket is mounted to a backside of the base and includes a bridge for receiving the at least one portion of the leg. The bridge includes a first detent and a second detent. The portion of the leg that is received by the bridge is movable into a first position or a second position. A different portion of the leg mates with the first detent to support the display stand at a first viewing angle when the leg is rotated while in the first position. Yet another portion of the leg mates with the second detent to support the display stand at a second viewing angle that is different from the first viewing angle when the leg is rotated while in the second position.

15 Claims, 11 Drawing Sheets

(56) References Cited

U.S. PATENT DOCUMENTS

| | | | |
|---|---|---|---|
| 2,954,630 A | 10/1960 | Hull | |
| 3,990,670 A * | 11/1976 | Frechtman | 248/470 |
| 4,356,991 A | 11/1982 | Hutchinson | |
| 5,098,056 A * | 3/1992 | Alger et al. | 248/463 |
| 5,915,661 A | 6/1999 | Silverman et al. | |
| 5,933,996 A | 8/1999 | Chang | |
| 6,282,827 B1 | 9/2001 | Holmes | |
| 7,542,276 B2 * | 6/2009 | Chang | 361/679.59 |
| 7,926,429 B2 | 4/2011 | Wu | |
| 8,226,054 B2 | 7/2012 | Chen et al. | |

\* cited by examiner

US 9,004,438 B2

DISPLAY STAND AND BRACKET

BACKGROUND

Cookbooks, recipes, pictures, art work and tablet computers are all exemplary products that take advantage of free-standing display stands, frames or easels for propping the product up for display. Because viewers view the products on the free-standing display stands, frames or easels from varying heights, the free-standing stands or easels often have more than one viewing angle.

The discussion above is merely provided for general background information and is not intended to be used as an aid in determining the scope of the claimed subject matter.

SUMMARY

A display stand includes a base, a leg and a bracket. The bracket is mounted to a backside of the base and includes a bridge for receiving the at least one portion of the leg. The bridge includes a first detent and a second detent. The portion of the leg that is received by the bridge is movable into a first position so that when the leg is rotated while in the first position, a different portion of the leg mates with the first detent to support the display stand at a first viewing angle. The portion of the leg that is received by the bridge is movable into a second position so that when the leg is rotated while in the second position, yet another portion of the leg mates with the second detent to support the display stand at a second viewing angle that is different from the first viewing angle.

In addition to the bridge, the bracket further includes a lower flange and an upper flange. The bridge couples the lower flange to the upper flange and is oriented along an axis and is configured to receive the leg. The bridge includes an outer surface that is located at a fixed distance from the axis and an inner surface that is located at a fixed distance from the axis. The first detent of the bridge further is oriented along a first surface plane that intersects with the axis, is defined between the outer surface and the inner surface of the bridge and extends between a first end of the bridge and a terminating end. The second detent of the bridge is oriented along a second surface plane that intersects with the axis, is defined between the outer surface and the inner surface of the bridge and extends between a second end of the bridge and a terminating end. The first surface plane of the first detent is oriented at an angle relative to the second surface plane of the second detent.

To adjust the viewing angle of the display stand, the portion of the leg that is engaged within the bridge is slid in a first direction along the axis and rotated until it mates with the first detent so that the viewing angle of the display stand is oriented into a first viewing angle. The portion of the leg that is engaged within the bridge is slid in a second direction along the axis and rotated until it mates with the second detent so that the viewing angle of the display stand is oriented into a second viewing angle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein include a display stand having a bracket that supports a support member or leg. Exemplary display stands can be frames, display holders, easels and the like. The bracket is a two stage bracket that is capable of supporting the support member or leg in two different configurations. In the first configuration, the bracket supports the support member or leg so a base of the display stand is oriented at a first viewing angle. In the second configuration, the bracket supports the support member or leg supports so the base of the display stand is oriented at a second viewing angle. Features of the bracket allow a user of the display stand to easily and simply adjust between the two different angles for optimal viewing of a product being held on the display stand. For example, the display stand might be capable of holding or displaying a cookbook, a recipe, a picture, art work, a tablet computer and the like.

Figure 1:
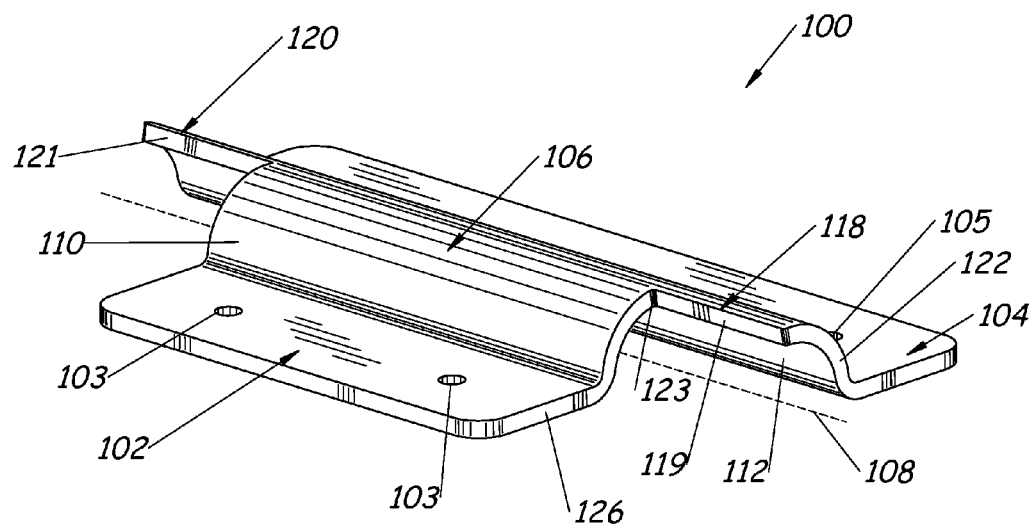
FIG. 1 is a front right side perspective view of a bracket for a display stand according to one embodiment.
Figure 2:
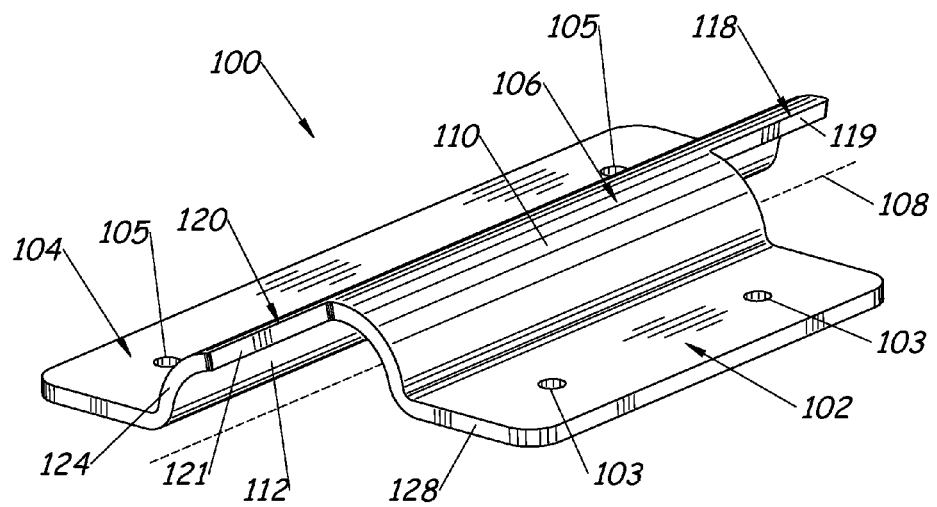
FIG. 2 is a front left side perspective view of the bracket illustrated in FIG. 1.
Figure 3:
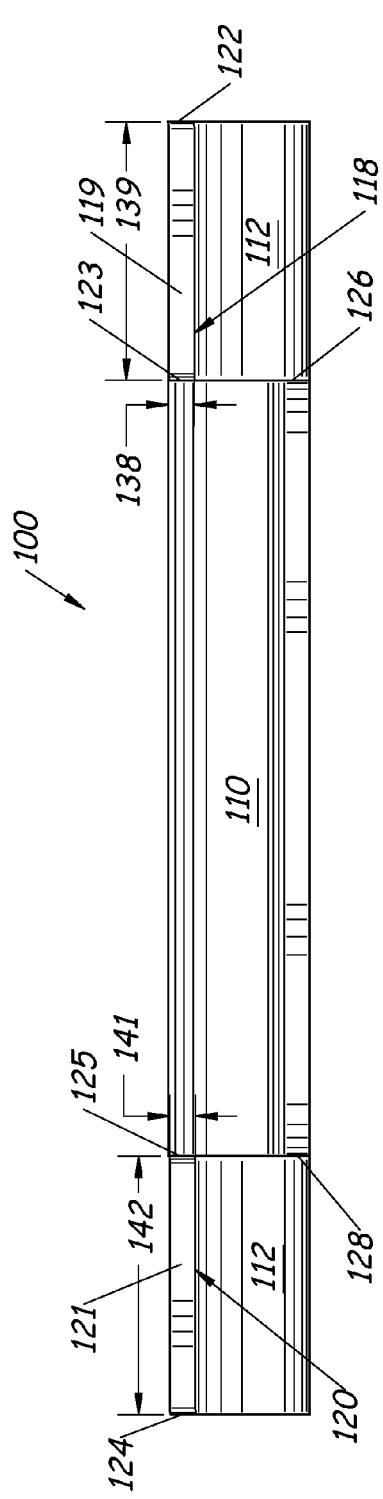
FIG. 3 is front view of the bracket illustrated in FIG. 1.
Figure 4:
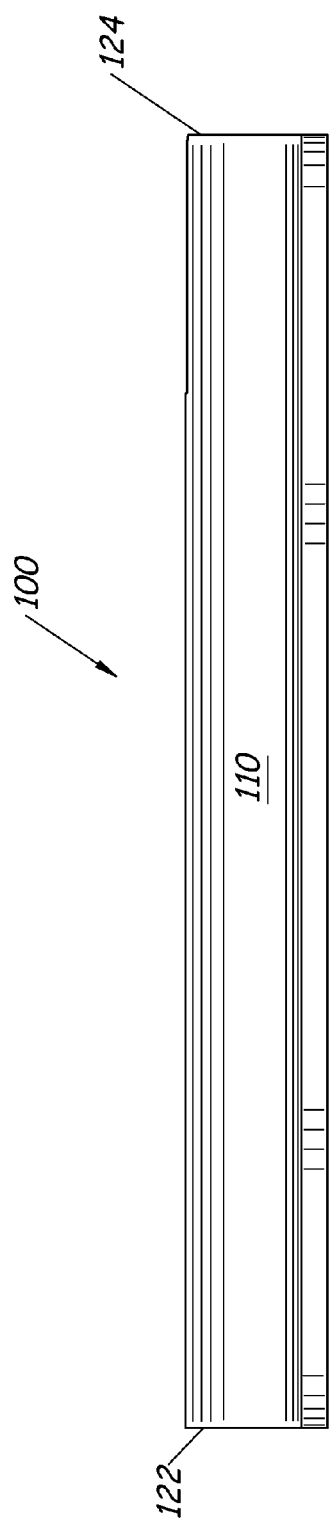
FIG. 4 is a back view of the bracket illustrated in FIG. 1.
Figure 5:
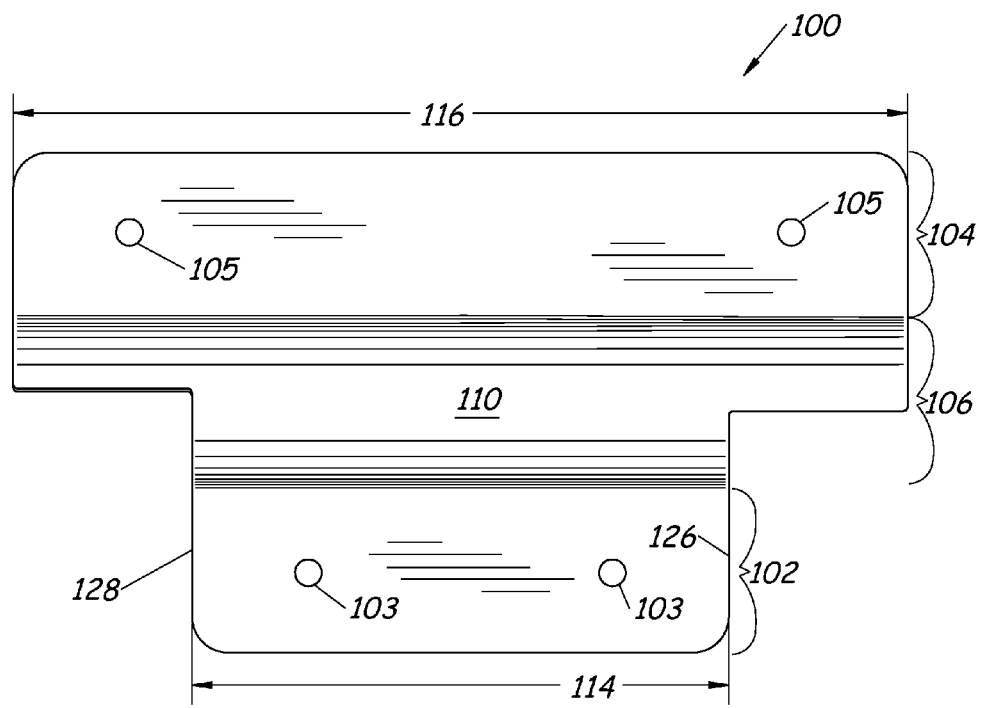
FIG. 5 is a top view of the bracket illustrated in FIG. 1.
Figure 6:
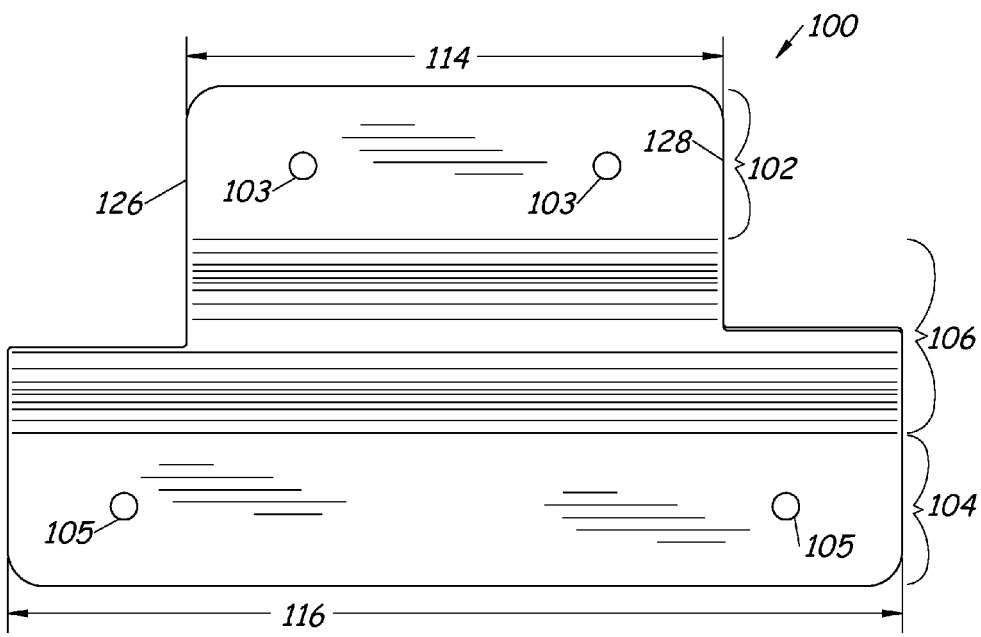
FIG. 6 is a bottom view of the bracket illustrated in FIG. 1.
Figure 7:
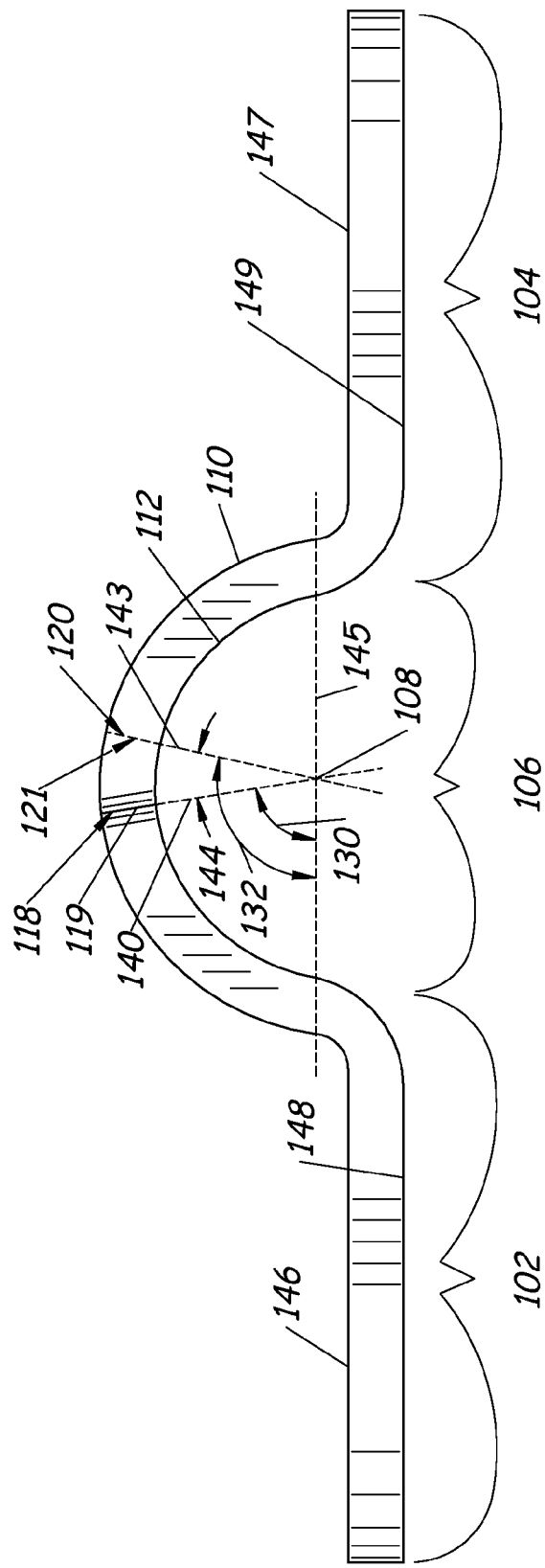
FIG. 7 is a right side view of the bracket illustrated in FIG. 1.
Figure 8:
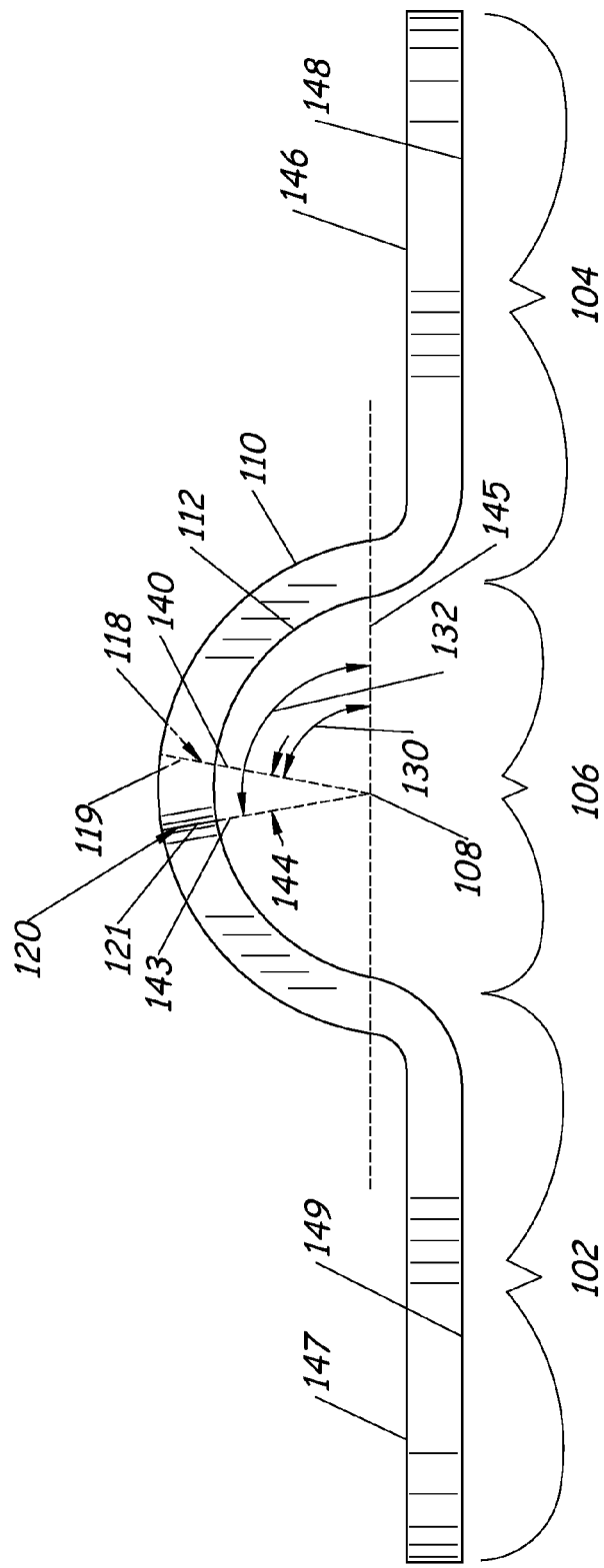
FIG. 8 is a left side view of the bracket illustrated in FIG. 1.

FIGS. 1-8 illustrate perspective and orthogonal views of a bracket 100 that is to be mounted to a base of a display stand according to one embodiment. In particular, FIGS. 1 is a front right side perspective view, FIG. 2 is a front left side perspective view, FIG. 3 is a front view, FIG. 4 is a back view, FIG. 5 is a top view, FIG. 6 is a back view, FIG. 7 is a right side view and FIG. 8 is a left side view. Bracket 100 includes a lower flange 102, an upper flange 104 and a spine or bridge 106 that couples the lower flange 102 to the upper flange 104. Spine 106 includes an outer surface 110, an inner surface 112 and is oriented along an axis 108. More specifically, outer surface 110 and inner surface 112 form curved or radial surfaces that are located at fixed distances from axis 108. Axis 108 is similar to an axis of a curvilinear geometric shape, such as a cylinder. In FIGS. 1-8, spine 106 is shaped like an open cylinder that has been cut in half at its axis 108. While spine 106 is illustrated as having curved surfaces, it should be realized that in the alternative, spine 106 can include rectilinear surfaces that are located at fixed distances from an axis, such as axis 108.

Inner surface 112 defines a space for receiving a support member or leg of a display stand. The space defined by inner surface 112 is adapted to receive at least one portion of a support member or leg that orients and supports the display stand at a viewing angle. In addition, lower flange 102 includes a plurality of holes 103 for receiving fasteners for mounting bracket 100 to a backside of a base of a display stand and upper flange 104 includes a plurality of holes 105 for receiving fasteners for mounting bracket 100 to the backside of the base of the display stand. While lower flange 102 includes a width 114 that is less than a width 116 of upper flange 104, the heights of each flange can be substantially equal or substantially different.

Spine 106 includes a first shoulder 118 having a first leg engaging surface or first detent 119 and a second shoulder 120 having a second leg engaging surface or a second detent 121. As illustrated in FIG. 3, a thickness 138 of first leg engaging surface or first detent 119 is defined between outer surface 110 and inner surface 112 and a width 139 of first leg engaging surface or first detent 119 extends between a first end 122 of spine 106 and a terminating end 123. Terminating end 123 of first shoulder 118, and therefore of first leg engaging surface or first detent 119, is in alignment with a right side edge 126 of lower flange 102. As illustrated in FIG. 3, a thickness 141 of second leg engaging surface or second detent 121 is defined between outer surface 110 and inner surface 112 and a width 142 of second leg engaging surface or second detent 121 extends between a second end 124 of spine 106 and a terminating end 125. Terminating end 125 of second shoulder 120, and therefore of second leg engaging surface or second detent 121, is in alignment with a left side edge 128 that opposes right side edge 126 of lower flange 102.

More specifically, first shoulder 118 or first leg engaging surface 119, as illustrated in FIGS. 7 and 8, is oriented along a surface plane 140 that intersects with axis 108 Likewise, second shoulder 120 or second leg engaging surface 121, as illustrated in FIGS. 7 and 8, is oriented along a surface plane 143 that intersects with axis 108. As further illustrated in FIGS. 7 and 8, surface plane 140 is at an angle 144 relative to surface plane 143. Due to the construction of spine 106, angle 144 can be less than 90 degrees or greater than 90 degrees. However, angle 144 cannot be more than 180 degrees. As illustrated in FIGS. 7 and 8, angle 144 is an acute angle. This acute angle 144 translates to first leg engaging surface 119 mating with a leg of a display stand so that a base of the display stand can be oriented at a first viewing angle and second leg engaging surface 121 mates with the leg so that the base of the display stand can be oriented at a second viewing angle.

The relative placement between first shoulder 118 or first leg engaging surface 119 and second shoulder 120 or second leg engaging surface 121 can be described in additional ways. For example, and as illustrated in FIGS. 7 and 8, an axial plane 145 can be defined as intersecting through axis 108, outer surface 110 and inner surface 112 and being substantially parallel with outer surfaces 146 and 147 and inner surfaces 148 and 149 of lower and upper flanges 102 and 104. First leg engaging surface 119 or surface plane 140 is located at a first angle 130 relative to axial plane 145, while second leg engaging surface or surface plane 143 is located at a second angle 132 relative to axial plane 145. First angle 130 is different from second angle 132 and the difference between second angle 132 and first angle 130 is substantially equal to angle 144.

Figure 9:
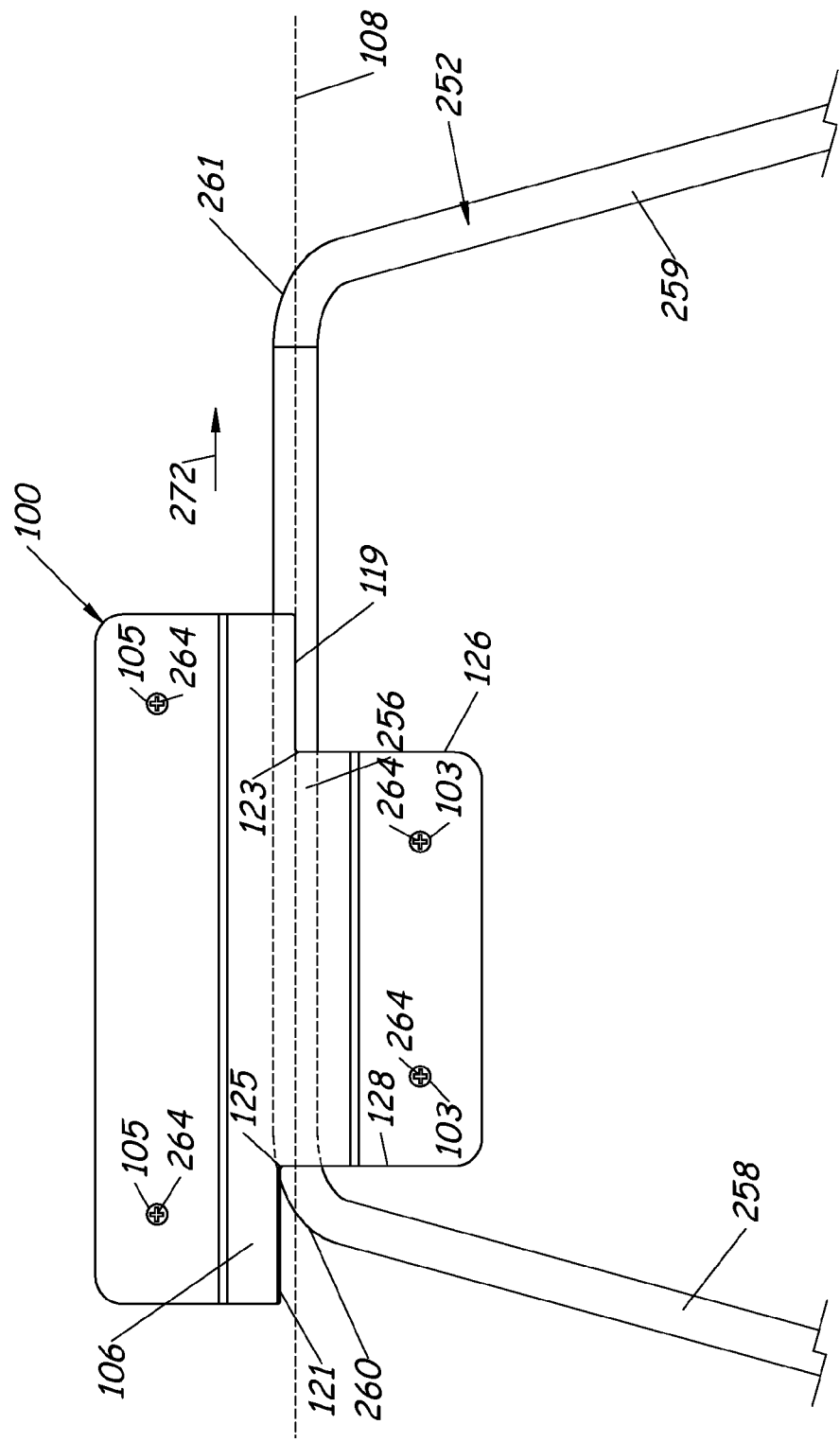
FIG. 9 illustrates a top view of the bracket of FIG. 1 as engaged with a support member of the display stand in a first configuration.
Figure 10:
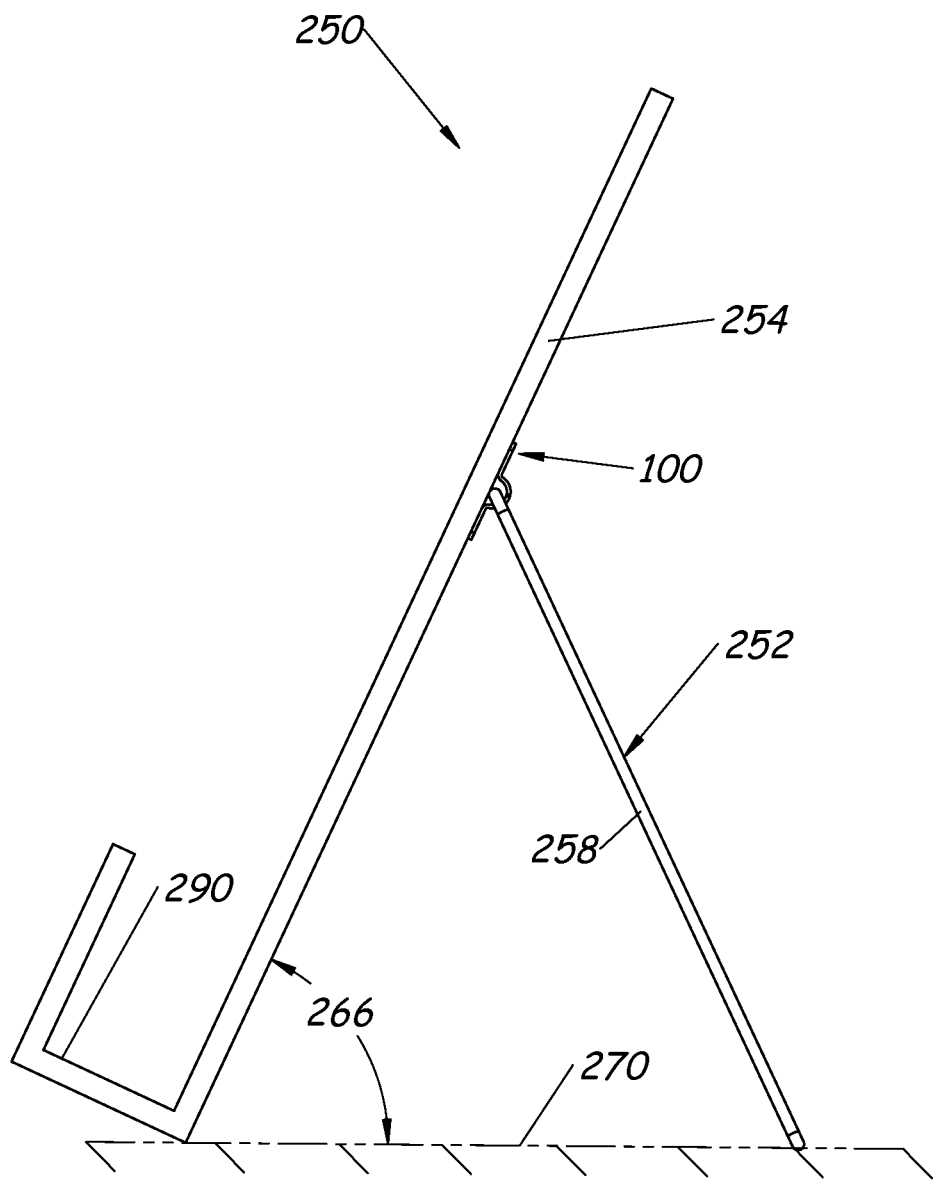
FIG. 10 illustrates a right side view of the display stand including a left side view of the bracket illustrated in FIG. 1 as mounted to the base and engaged with the support member in the first configuration illustrated in FIG. 9.
Figure 11:
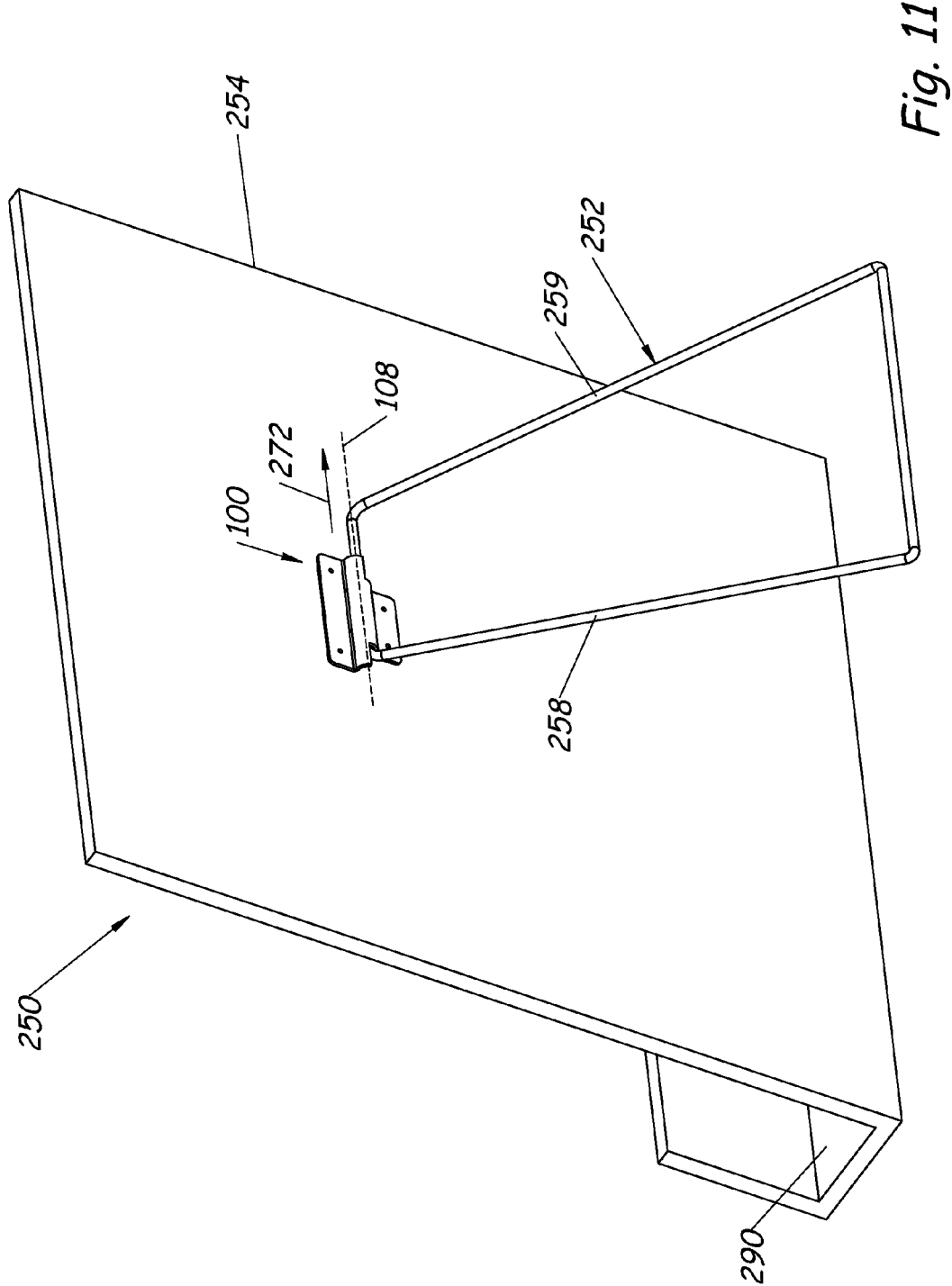
FIG. 11 illustrates a back right perspective view of the display stand including a top left perspective view of the bracket illustrated in FIG. 1 as mounted to the base and engaged with the support member in the first configuration illustrated in FIG. 9.

FIG. 9 illustrates an enlarged top view of bracket 100 as engaged with a support member or leg 252 of a display stand 250 in a first configuration. FIG. 10 illustrates a right side view of display stand 250 including a left side view of bracket 100 as mounted to a base 254 of display stand 250 and engaged with leg or support member 252 in the first configuration. FIG. 11 illustrates a back right perspective view of display stand 250 including a top left perspective view of bracket 100 as mounted to base 254 of display stand 250 and engaged with leg or support member 252 in the first configuration. Display stand 250 includes base 254, leg or support member 252 and bracket 100. Base 254 is the component of display stand 250 that holds a product up for display, while leg or support member 252 is the component of the display stand 250 that holds base 254 up at a viewing angle. As illustrated in FIGS. 10 and 11, base 254 includes a bottom lip 290 so as to hold a bottom of a cookbook, a recipe, a picture, art work, a tablet computer or the like. FIG. 10 illustrates one exemplary embodiment of base 254; however, base 254 can include other features or additional features for holding products for display.

Leg or support member 252 includes at least one spine engaging or bridge engaging portion 256, a pair of support portions 258 and 259 and corners 260 and 261 that couple the at least one spine engaging portion 256 with support portions 258 and 259. Corner 260 couples support portion 258 to spine engaging portion 256 and corner 261 couples support portion 259 to spine engaging portion 256.

Bracket 100 includes fasteners 264 that are inserted through holes 103 and 105 to secure bracket 100 to base 254 and therefore secure spine or bridge 106 to base 254 for receiving spine engaging portion 256 of leg 252. As described above, spine 106 includes a first leg engaging surface or first detent 119 and a second leg engaging surface or second detent 121. Spine engaging or bridge engaging portion 256 of leg 252 is slidable within spine or bridge 106 of bracket 100 along axis 108 and support portions 258 and 259 are configured to mate with either first leg engaging surface or first detent 119 or second leg engaging surface or second detent 121 to orient display stand 250 at a first viewing angle or a second viewing angle.

As illustrated in FIGS. 9 and 11, spine engaging or bridge engaging portion 256 of support member or leg 252 is slidable along axis 108 in a first direction 272 until spine engaging portion 256 can no longer slide within spine or bridge 106 because corner 260 has reached a surface of spine 106 that is in alignment with terminating end 125 and side edge 128 of lower flange 102. Support member or leg 252 is then rotated so that support portion 258 mates with second leg engaging surface or second detent 121. In this configuration, second leg engaging surface or second detent 121 prevents support member or leg 252 from further rotating and display stand 250 is held at an orientation of a first viewing angle 266 (FIG. 10). As illustrated in FIG. 10, first viewing angle 266 is defined as being the angle between base 254 and a surface 270 that display stand 250 rests upon. As illustrated in FIG. 10, first viewing angle 266 can be approximately 65 degrees. However, other angles are possible.

Figure 12:
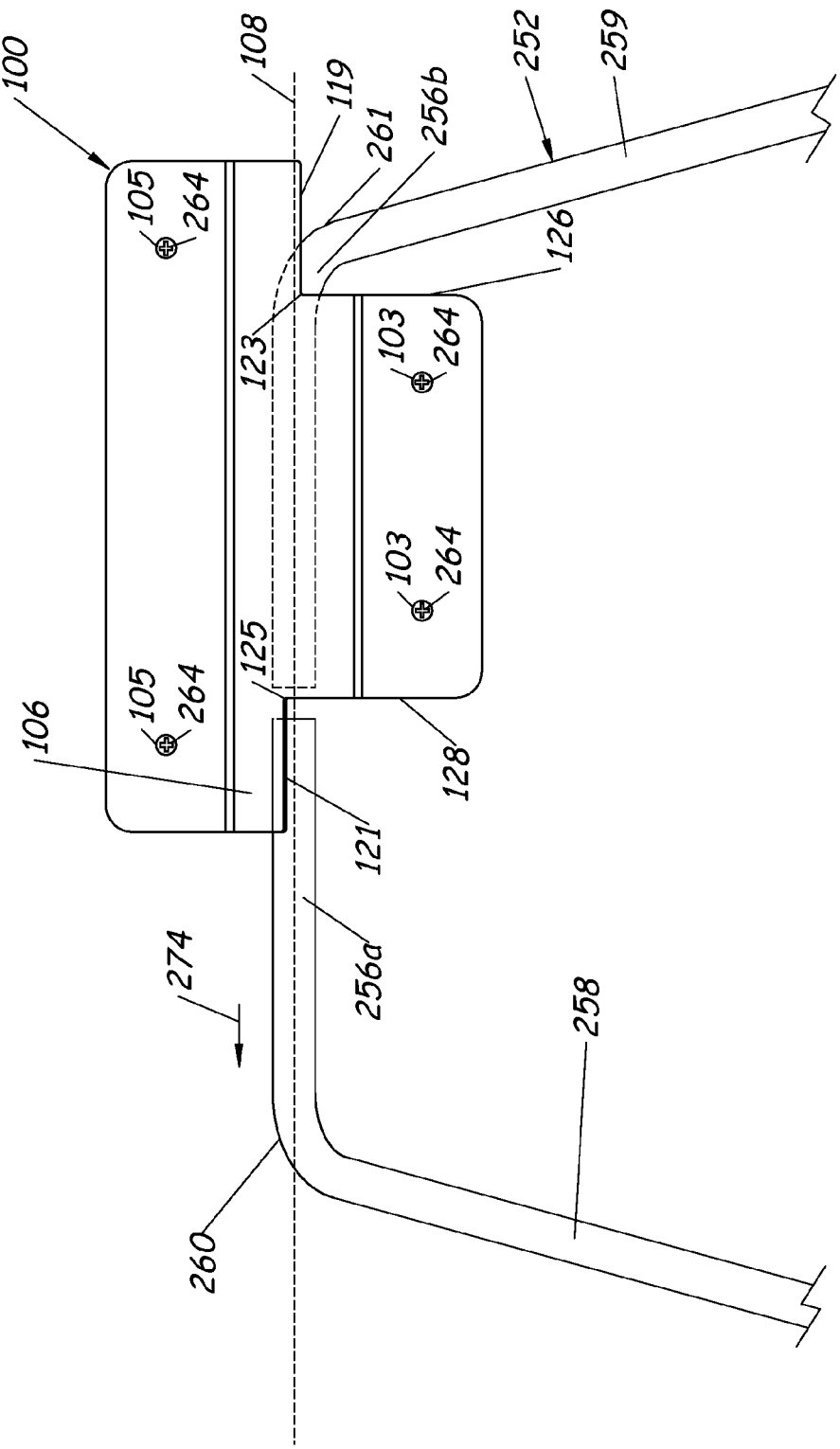
FIG. 12 illustrates a top view of the bracket of FIG. 1 as engaged with the support member of the display stand in a second configuration.
Figure 13:
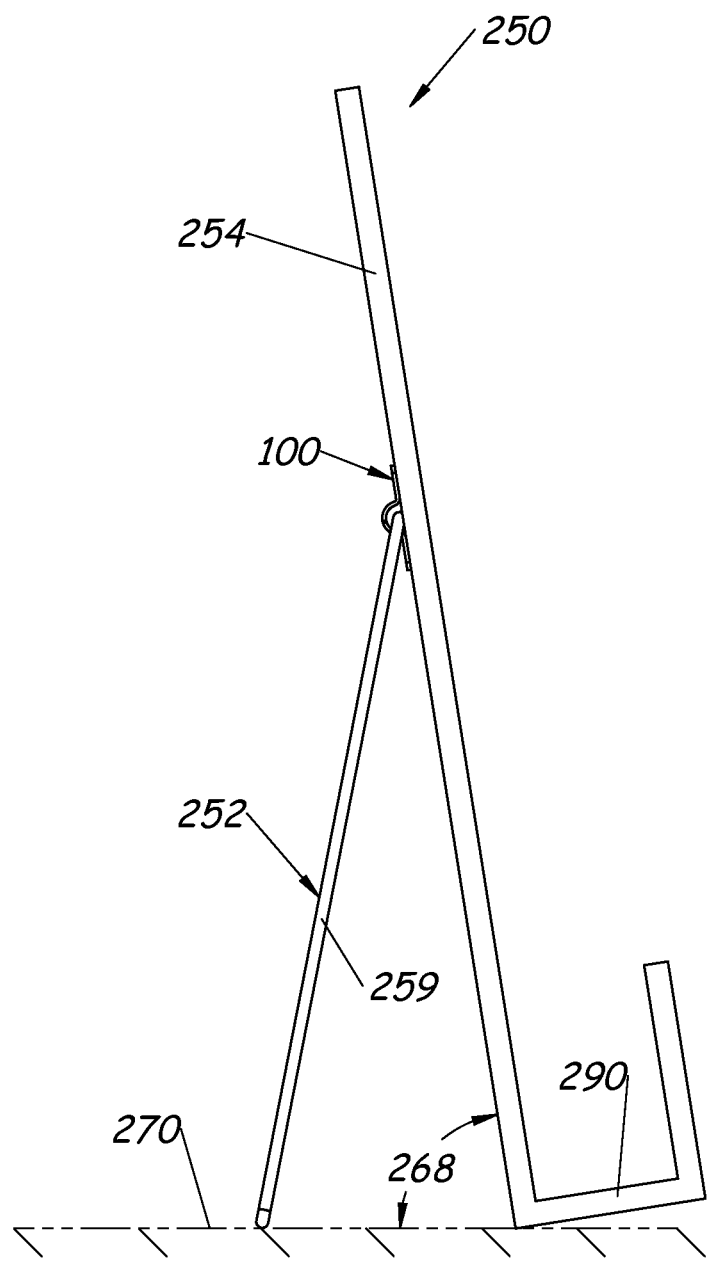
FIG. 13 illustrates a left side view of the display stand including a right side view of the bracket illustrated in FIG. 1 as mounted to the base and engaged with the support member in the second configuration illustrated in FIG. 12.

FIG. 12 illustrates an enlarged top view of bracket 100 as engaged with support member 252 of display stand 250 in a second configuration. FIG. 13 illustrates a left side view of display stand 250 including a right side view of bracket 100 as mounted to base 254 of display stand 200 and engaged with leg or support member 252 in the second configuration. FIG.

Figure 14:
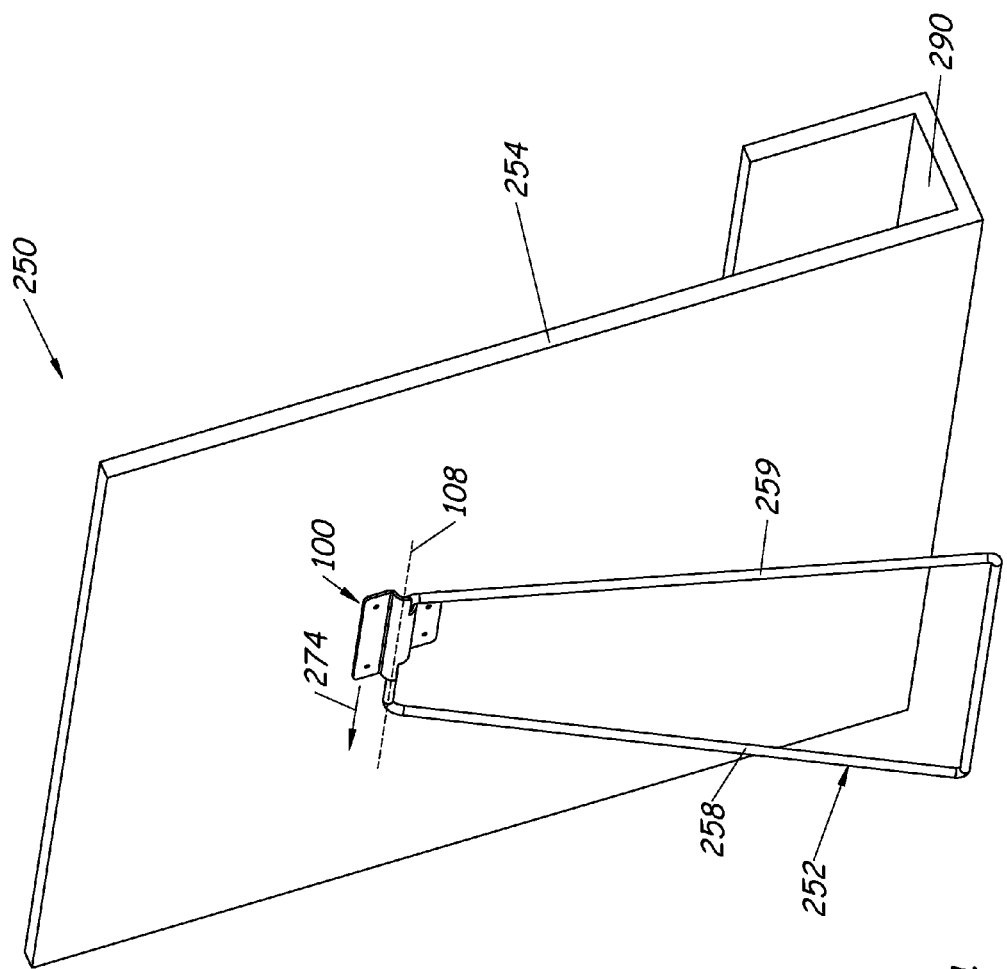
FIG. 14 illustrates a back left perspective view of the display stand including a top right perspective view of the bracket illustrated in FIG. 1 as mounted to the base and engaged with the support member in the second configuration illustrated in FIG. 12.

14 illustrates a back left perspective view of display stand 250 including a top right perspective view of bracket 100 as mounted to base 254 of display stand 250 and engaged with leg or support member 252 in the first configuration. As described with reference to FIGS. 9-11, display stand 250 includes base 254, leg or support member 252 and bracket 100. Base 254 is the component of the display stand 250 that holds up a product for display, while leg or support member 252 is the component of the display stand 250 that holds base 254 up at a viewing angle. As illustrated in FIGS. 13 and 14, base 254 includes bottom lip 290 so as to hold a bottom of a cookbook, a recipe, a picture, art work, a tablet computer or the like. FIGS. 13 and 14 illustrate one exemplary embodiment of base 254; however, base 254 can include other features or additional features for holding products for display.

In one embodiment and as illustrated in phantom in FIG. 12, leg 252 includes two spine engaging or bridge engaging portions 256a and 256b. Rather than spine engaging portion 256 including a single portion as illustrated in FIG. 9, spine engaging portion 256 includes two portions having ends that are spaced apart from each other. In this way, rather than spine engaging portion 256 having to be coupled to bracket 100 when bracket 100 is mounted to base 254 as would be the case in FIGS. 9-11, spine engaging portion 256 can be easily inserted into spine or bridge 106 by a user after bracket 100 is mounted to base 254 or easily removed from spine or bridge 106 by the user after bracket 100 is mounted to base 254. Corner 260 couples support portion 258 to spine engaging portion 256a and corner 261 couples support portion 259 to spine engaging portion 256b.

Spine engaging portions 256a and 256b of leg 252 are slidable within spine or bridge 106 of bracket 100 along axis 108 and support portions 258 and 259 are configured to mate with either first leg engaging surface or first detent 119 or second leg engaging surface or second detent 121 to orient display stand 250 at a first viewing angle or a second viewing angle.

As illustrated in FIGS. 12 and 14, spine engaging or bridge engaging portions 256a and 256b are slidable along axis 108 in a second direction 274, which is opposite first direction 272, until spine engaging portions 256a and 256b can no longer slide within spine or bridge 106 because corner 261 has reached a surface of spine 106 that is in alignment with terminating end 123 and side edge 136 of lower flange 102. Support member or leg 252 is then rotated so that support portion 259 mates with first leg engaging surface or first detent 119. In this configuration, first leg engaging surface or first detent 119 prevents support member or leg 22 from further rotating and display stand 250 is held at an orientation of a second viewing angle 268 (FIG. 13). As illustrated in FIG. 13, second viewing angle 268 is defined as being the angle between base 254 and a surface 270 that display stand 250 rests upon. As illustrated in FIG. 13, second viewing angle 268 can be approximately 80 degrees. While second viewing angle 268 can include a variety of angle values, it should be understood that second viewing angle 268 is different from first viewing angle 266, and in some embodiments and as illustrated in FIGS. 9-12, second viewing angle 268 is greater than first viewing angle 266.

As previously described, outer surface 110 and inner surface 112 of spine or bridge 106 are radial surfaces. However, outer surface 110 and inner surface 112 need not have radial surfaces and can have other types of shapes, such as rectilinear surfaces. As illustrated in the figures, leg or support member 252 is a wire member. However, inner surface 112 need not include a corresponding radial shaped surface to receive the wire member.

To adjust the viewing angle of display stand 250, at least one spine engaging or bridge engaging portion 256 of support member 252 of display stand 250 is engaged with inner surface 112 of spine 106 and is oriented along axis 108. Spine 106 couples first flange 102 that is mounted to the backside of display stand 250 to second flange 104 that is mounted to the backside of display stand 250. The at least one spine engaging portion 256 of support member 252 is slid in first direction 272 along axis 108. Support member 252 is then rotated until it mates with second detent 121 on spine 106 to orient the viewing angle of display stand 250 into first viewing angle 266. The at least one spine engaging portion 256 of support member 252 is slid in second direction 274 along axis 108. Support member 252 is then rotated until it mates with first detent 119 on spine 106 to orient the viewing angle of display stand 250 into a second viewing angle 268.

When orienting the viewing angle of display stand 250 into a first viewing angle 266, support member 252 is rotated to mate second detent 121 with support portion 258. When orienting the viewing angle of display stand 250 into a second viewing angle 268, support member 252 is rotated to mate first detent 119 with support portion 259. In this way, bracket 100 is a two stage bracket that includes features that allow support member 252 to be adjusted into two different positions for attaining two different viewing angles.

Additionally, support member 252 can fold up against base 254. This can be accomplished in multiple different ways. For example, when at least one spine engaging portion 256 is slid within spine 106 in first direction 272 for mating second detent 121 with support portion 258, support member 252 cannot be rotated upwardly past second detent 121 in this position, however, support member 252 can be rotated downwardly to lie flat against base 254 of display stand 250. Similarly and in another example, when at least one spine engaging portion 256 is slid within spine 106 in second direction 274 for mating first detent 119 with support portion 258, support member 252 cannot be rotated upwardly past first detent 119 in this position, however, support member 252 can be rotated downwardly to lie flat against base 254 of display stand 250. Still further and in yet another example, at least one spine engaging portion 256 is movable within spine 106 and can attain a position where neither support portion 258 nor support portion 259 can mate with second detent 121 or first detent 119 when support member 252 is rotated. In this position, support member 252 can be rotated upwardly or downwardly to lie flat against base 254 of display stand 250.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A display stand comprising:
a base;
a leg; and
a bracket mounted to a backside of the base and including
a bridge for receiving at least one portion of the leg, the bridge having a first detent and a second detent;
wherein:
the portion of the leg that is received by the bridge is movable into a first position so that when the leg is rotated while in the first position, a different portion of the leg mates with the first detent to support the display stand at a first viewing angle, the portion of the leg that is received by the bridge is movable into a second position so that when the leg is rotated while in the second position, yet another portion of the leg mates with the second detent to support the display stand at a second viewing angle that is different from the first viewing angle, the first detent extends within a first surface plane, and the second detent extends within a second surface plane that differs from and intersects the first surface plane.

2. The display stand of claim 1, wherein the first viewing angle and the second viewing angle are defined between the base of the display stand and a surface to which the display stand rests upon.

3. The display stand of claim 1, wherein the bracket further comprises an upper flange having holes for mounting to the backside of the base and a lower flange having holes for mounting to the backside of the base, wherein the bridge couples the upper flange to the lower flange.

4. A display stand comprising:
a base;
a leg; and
a bracket mounted to a backside of the base and including a bridge for receiving at least one portion of the leg, the bridge having a first detent and a second detent;
wherein:
the portion of the leg that is received by the bridge is movable into a first position so that when the leg is rotated while in the first positions different portion of the leg mates with the first detent to support the display stand at a first viewing angle,
the portion of the le that is received b the bridge is movable into a second position so that when the le is rotated while in the second position et another portion of the le mates with the second detent to support the display stand at a second viewing angle that is different from the first viewing angle,
the bridge comprises an outer surface and an inner surface and is oriented along an axis,
the outer surface and the inner surface are located at fixed distances from the axis,
an axial plane is defined through the axis and extends substantially parallel to a back surface of the base,
the first detent is oriented along a first surface plane that intersects with the axis and the second detent is oriented along a second surface plane that intersects with the axis, and
the first surface plane of the first detent and the second surface plane of the second detent are each orientated at different angles relative to the axial plane.

5. A bracket comprising:
a lower flange and an upper flange; and
a spine coupling the lower flange to the upper flange and being oriented along an axis, wherein the spine is configured to receive a support member and comprises:
an outer surface and an inner surface, wherein the outer surface and the inner surface are located at fixed distances from the axis;
a first shoulder defined between the outer surface and the inner surface of the spine and extends between a first end of the spine and a terminating end, wherein the first shoulder is oriented along a first surface plane that intersects with the axis; and
a second shoulder defined between the outer surface and the inner surface of the spine and extends between a second end of the spine and a terminating end, wherein the second shoulder is oriented along a second surface plane that intersects with the axis;
wherein the first surface plane of the first shoulder differs from the second surface plane and is oriented at an angle relative to the second surface plane of the second shoulder.

6. The bracket of claim 5, wherein the axis defines an axial plane that intersects the inner surface, the outer surface and the axis and is substantially parallel with top and bottom surfaces of the lower and upper flanges, wherein the first surface plane is located at a first angle relative to the axial plane and the second surface plane is located at a second angle relative the axial plane, the first angle being different from the second angle.

7. The bracket of claim 6, wherein a difference between the second angle and the first angle is substantially equal to the angle between the first surface plane of the first shoulder and the second surface plane of the second shoulder.

8. The bracket of claim 5, wherein the lower and upper flanges comprise holes for mounting the bracket to a backside of a display stand for displaying a product.

9. The bracket of claim 5, wherein the inner surface of the spine defines a space that receives the support member, the support member comprising a wire member having at least one spine engaging portion and a pair of support portions that couple to the at least one spine engaging portion at a pair of corners.

10. The bracket of claim 9, wherein the first shoulder is configured to engage with one of the support portions of the support member to orient a display stand to which the bracket is mounted to at a first viewing angle, and the when the first shoulder engages with one of the support portions of the support member, the second shoulder is spaced from the other of the support portions.

11. The bracket of claim 10, wherein the second shoulder is configured to engage with the other of the support portions of the support member to orient the display stand at a second viewing angle that is different from the first viewing angle.

12. The bracket of claim 5, wherein the terminating end of the first shoulder is in alignment with a side edge of the lower flange.

13. The bracket of claim 12, wherein the terminating end of the second shoulder is in alignment with an opposing side edge of the lower flange.

14. The display stand of claim 1, wherein:
the leg linearly slides along a rotational axis thereof between the first position and the second position, and
while in each of the first position and the second position, the leg only mates with a different one of the first detent and the second detent.

15. The display stand of claim 1, wherein:
the leg includes:
a spine engaging portion received by the bridge,
a first supporting portion extending downwardly away from a first end of the spine engaging portion, and
a second supporting portion extending downwardly away from a second end of the spine engaging portion, and
the spine engaging portion linearly slides relative to the bridge between the first position and the second position,
in the first position, one of the supporting portions abuts the first detent and the other supporting portion is spaced from the bracket, and
in the second position, the other one of the supporting portions abuts the second detent and the one of the supporting portions is spaced from the bracket.

* * * * *